United States Patent [19]

Bayly et al.

[11] 4,033,699

[45] July 5, 1977

[54] VAPOR CONCENTRATION MONITOR

[75] Inventors: John G. Bayly; Ronald J. Booth, both of Deep River, Canada

[73] Assignee: Atomic Energy of Canada Limited, Ottawa, Canada

[22] Filed: May 30, 1975

[21] Appl. No.: 582,183

[30] Foreign Application Priority Data

Aug. 1, 1974   Canada .............................. 206124

[52] U.S. Cl. .............................. 356/205; 250/343; 356/51; 356/189
[51] Int. Cl.² ........................................ G01N 21/26
[58] Field of Search ............ 356/51, 188, 189, 201, 356/204, 205; 250/343

[56] References Cited

UNITED STATES PATENTS

| | | | |
|---|---|---|---|
| 3,784,307 | 1/1974 | Jackson et al. | 356/51 |
| 3,860,818 | 1/1975 | Stalder et al. | 356/51 |
| 3,861,809 | 1/1975 | Hall, Jr. | 356/51 X |
| 3,932,040 | 1/1976 | Warncke | 356/201 |

FOREIGN PATENTS OR APPLICATIONS

896,736   5/1962   United Kingdom ............... 356/205

OTHER PUBLICATIONS

Wood, The Review of Scientific Instruments, vol. 29, No. 1, Jan. 1958, pp. 36–41.

Primary Examiner—Edward S. Bauer
Assistant Examiner—F. L. Evans
Attorney, Agent, or Firm—Edward Rymek

[57]   ABSTRACT

An apparatus for monitoring the concentration of a vapor, such as heavy water, having at least one narrow bandwidth in its absorption spectrum, in a sample gas such as air. The air is drawn into a chamber in which the vapor content is measured by means of its radiation absorption spectrum. High sensitivity is obtained by modulating the wavelength at a relatively high frequency without changing its optical path, while high stability against zero drift is obtained by the low frequency interchange of the sample gas to be monitored and of a reference sample. The variable HDO background due to natural humidity is automatically corrected.

8 Claims, 3 Drawing Figures

VAPOR CONCENTRATION MONITOR

This invention is directed to a vapour monitor and in particular to a highly sensitive monitor having virtually zero drift which finds particular application in measuring the amount by which the heavy water vapour in air exceeds the amount which would be present as a result of the natural humidity of the air.

A substantial fraction of the heavy water lost from a CANDU reactor is carried away by ventilating or cooling air. The value of lost heavy water from a reactor or in heavy water production plants is economically significant.

Before such losses can be prevented, they must be detected and located. To detect the onset of a leak requires continuous monitoring of the air leaving the reactor building. To locate a new leak, one frequently must check several air streams to track the vapour back to its source.

In the prior art monitors, interference filters are used, with an infrared beam passing alternately through a vapour-filled chamber and a reference chamber and the heavy water vapour concentration affects the intensity seen by a detector. The filters had bandwidths of the order of 100 nm, and interference due to other vapours such as $H_2O$, $CO_2$ and $CH_4$ occurred.

Various versions of rotating filter analyzers for liquid water are also available which can monitor natural water to determine its heavy water content. To use these analyzers for measuring heavy water vapour it is necessary to condense the water from the air and analyze the condensate. They have the advantage that they measure only the amount by which the $D_2O$ exceeds the natural abundance of $D_2O$.

Experience with these condensate monitors has demonstrated the useful range of sensitivities and speeds of response. It also emphasized the importance of finding a much simpler operating principle which could lead to a cheaper less complicated and more reliable instrument, and the necessity of using the narrowest possible pass bands.

It is therefore an object of this invention to provide a vapour monitor which is highly sensitive in measuring the concentration of a particular vapour but insensitive to other common vapours which may be present.

It is another object of this invention to provide a monitor for a particular vapour which is not sensitive to the presence of that vapour due to its naturally occurring presence in the atmosphere.

It is a further object of this invention to provide a vapour monitor which continuously measures the concentration of a particular vapour with virtually zero drift.

It is another object of this invention to provide a vapour monitor which measures the concentration of a particular vapour relative to the concentration of that vapour in any reference stream of gas.

It is a further object of this invention to provide a vapour monitor capable of a high speed of response.

These and other objects are achieved in a vapour monitor system having an absorption chamber which is alternately filled with a sample gas that includes the vapour to be measured and a reference gas that includes the vapour at natural or reference levels. A light beam consisting of a very narrow band of wavelengths which are alternately coincident and non-coincident with the absorption bandwidth of the vapour in question is directed through the chamber by means of a multiple reflection mirror system and the intensity of the beam is then detected. A means of adjusting the ratio of the intensities of the two beams is provided so that when the chamber contains a predetermined amount of vapour (normally either zero or the natural concentration of vapour, there will be no modulation of the intensity when the beam alternates between the coincident and non-coincident wavelengths. If the amount of vapour in the chamber changes from the predetermined amount the intensity will be modulated and the detector will produce a voltage, proportional to the change in vapour amount, at the wavelength alternation frequency. Drift is minimized by using a single source, a single detector and a single beam path for both coincident and non-coincident beams. To finally eliminate draft caused by changes in the spectrum of the source or any optical components, the modulation obtained when the sample is present is corrected by the modulation obtained when the reference gas is present.

The system has a very high sensitivity for all vapours which have at least one narrow absorption band such as heavy water, phenols, oxphenols, chlorophenols, xylenol or acetylene.

In one particular embodiment, the sample gas and the reference gas are pumped through the chamber alternately, with each flowing at constant pressure for forty seconds, ($f = 12.5$ mHz). At the same time, the wavelength of the beam is changed at a frequency of approximately 85 Hz by changing the angle of incidence between the beam and a narrow bandwidth filter. The angle change is produced by mounting the filter on a torsional oscillator and adjusting it to operate between optimum angles of incidence.

Figure 1:
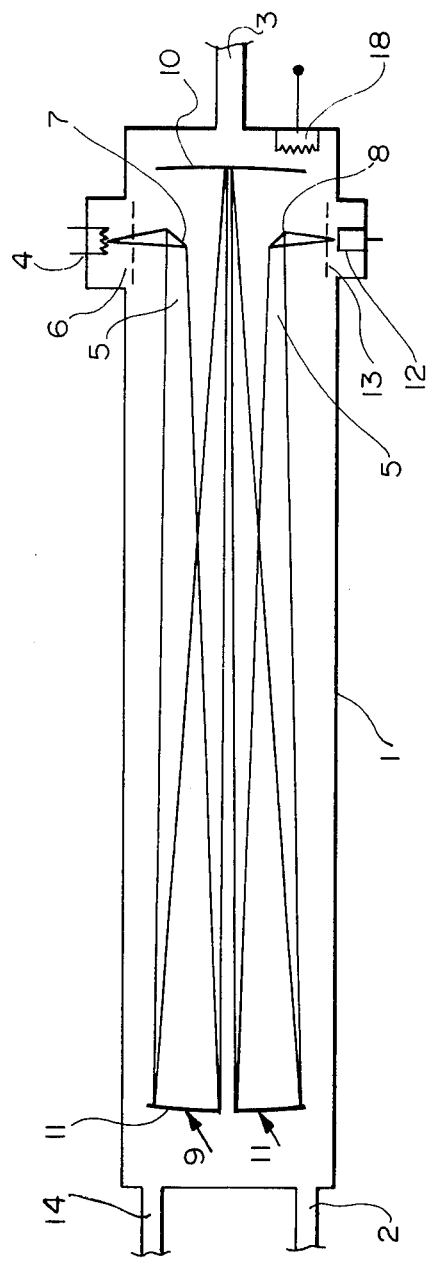
FIG. 1 illustrates an absorption chamber in accordance with this invention.
Figure 2:
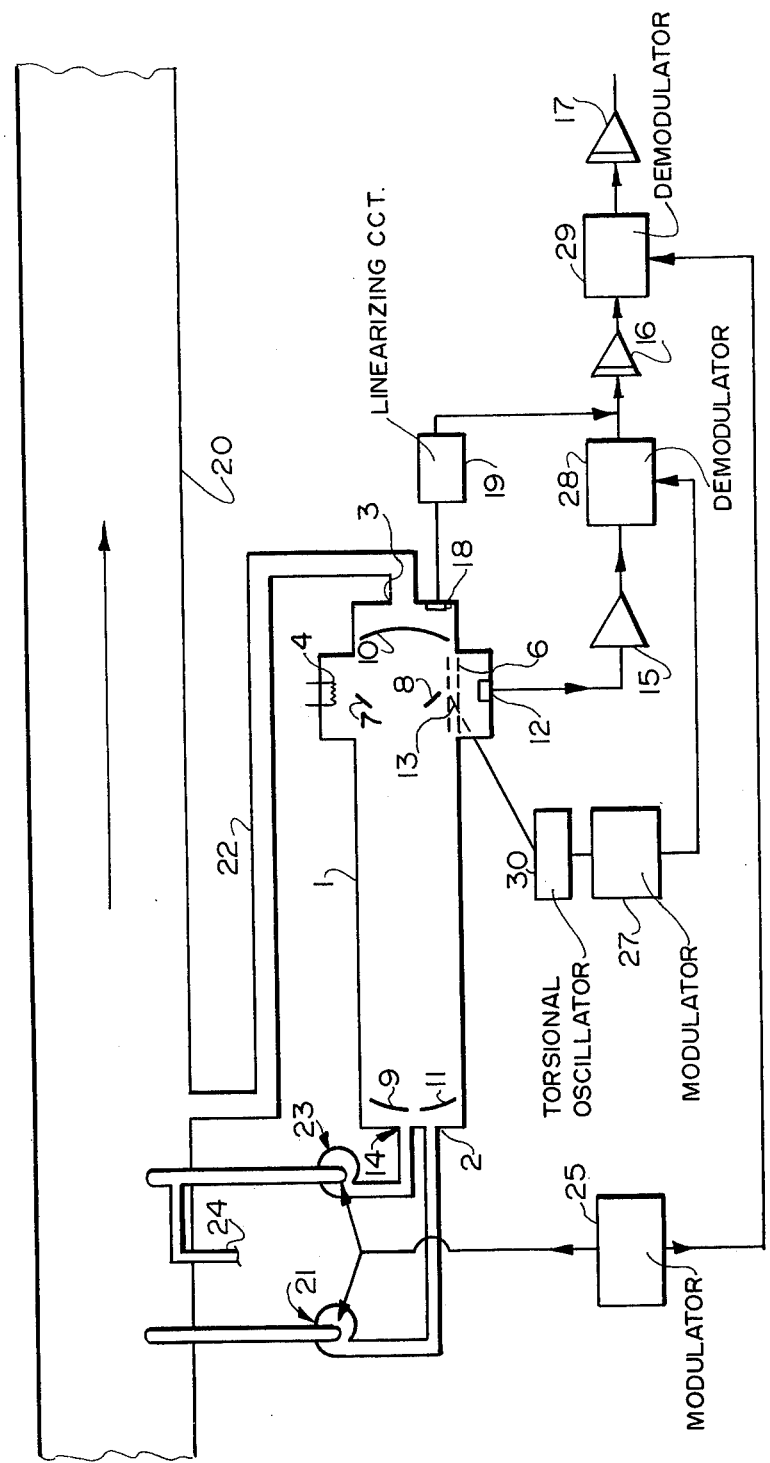
FIG. 2 illustrates a vapour monitoring system in accordance with this invention.

The vapour monitor of this invention includes an absorption chamber 1, illustrated in FIG. 1, through which gas having the vapour to be measured, and reference gas alternately enter the chamber 1 by means of inlet 2 and inlet 14 respectively and exit by means of outlet 3. A radiation source 4 provides a beam 5 having a broad bandwidth which includes the absorption band of interest for the particular vapour to be monitored such as heavy water, phenols, oxyphenols, chlorophenols, xylenol, acetylene or other vapour with at least one narrow absorption band. The intensity of the beam may be adjusted such that it is constant over the entire wavelength scan and in particular for the absorption and non-absorption bandwidth used for monitoring a particular vapour. This may be done by providing a broad pass band filter 6 and rotating it to shift its spectrum until, in the region of interest, its spectral slope compensates for the spectral slope of the other optical components. For heavy water, a filter centered at 3.68 $\mu$m for normal incidence with a pass band $\sim 0.25$ $\mu$m wide has been found to be suitable. Filter 6 may be located near source 4, as shown in FIG. 1 or near detector 12, as shown in FIG. 2.

An optical system, including two plane mirrors 7 and 8 and three spherical mirrors 9, 10 and 11, provide multiple reflections of the beam 5 within the absorption chamber 1. The multiple reflections provide greater sensitivity, and it is preferred to have long paths between reflections to avoid undue noise generated by adsorption effects at the mirrors due to humidity. The absorption chamber 1 is thus preferably long and narrow which also assists in flushing one gas (sample or reference) out of the chamber by the other.

A beam intensity detector 12 is mounted within the chamber to detect the beam 5 after it has passed through the gas. To achieve maximum sensitivity a narrow bandwidth beam, scanned over a very small spectral range without occulting or even significantly modulating the intensity except as a consequence of the presence of the particular vapour, is allowed to pass to the detector. This is achieved by means of a narrow bandwidth filter 13 mounted on a torsional oscillator which changes the angle of incidence between the beam 5 and the filter 13, such that the oscillator at one limit of scan angle centers the filter pass band at the absorption band, while at the other limit of scan angle takes the pass band just off the absorption band, without changing the beam path.

Finally a humidity sensor 18 may be located within the chamber 1. The use and operation of sensor 18 will be described more fully with respect to FIG. 2.

The absorption chamber 1 may be incorporated into a monitoring system of the type shown in FIG. 2.

The air to be monitored for a particular vapour may be flowing in the indicated direction through a duct 20 such as a ventilation or air conditioning duct. A blower 21 pumps a sample of this gas through chamber 1 and back to duct 20 by means of inlet 2, outlet 3 and pipe 22. Alternately, blower 23 pumps reference air through chamber 1, using a separate inlet 14 and the same outlet 3. Reference air which includes normal amounts of the vapour to be detected may be taken from a compressed air supply or via a blower (not shown) from the atmosphere through piping 24 which may be open to duct 20 so as to maintain similar pressures between the reference and sample air.

The connections between the duct 20 and the blowers should be arranged so that no air from the duct can enter blower 23. The use of separate entrances, 2 and 14, minimizes the flow of air in the reverse direction through the inactive blower and makes the flushing of chamber 1 more complete.

Blowers 21 and 23 are controlled by means of a modulator 25 which causes the blowers to operate sequentially, typically at a frequency in the order of 12.5 mHz, so that the blowers 21 and 23 are alternately switched on for 40 second intervals as shown in FIG. 3(a). These intervals must be sufficiently long to allow the air from the sample or reference to flush out virtually all of the air preceeding it even if the air flow rate is substantially lower than optimum. At the same time, the intervals must be sufficiently short to provide for a short response time especially for the occurrence of large concentrations of the vapour to be monitored.

A second modulator 27 cyclically varies the wavelength of the part of beam 5 which passes to the detector 12, by providing a signal to a torsional oscillator 30 that oscillates the narrow bandwidth filter 13. The wave-length varies as shown in FIG. 3(b) between the limits of coincidence $\lambda_c$ or non-coincidence $\lambda_n$ with the absorption band of the vapour to be measured, at a frequency of approximately 85 Hz. However, much higher frequencies of modulation are practical and advantageous because most infrared detectors have less noise at higher modulation frequencies.

The output signal from the detector is shown schematically in FIG. 3(c). The intensity I of the light at the detector is $I_{ns}$ when the pass band of the filter 13 is non-coincident with the absorption band of the vapour and the chamber is filled with the sample air. Its amplitude is $I_{cs}$ when the pass band is coincident with the absorption band and when sample air is in the chamber 1. When the chamber is filled with reference air, the amplitudes are $I_{nr}$ and $I_{cr}$ at the non-coincident and coincident wave-lengths respectively. Amplifier 15 is FIG. 2 receives the signal from detector 12 and passes only frequencies near the wavelength changing frequency, e.g. 85 Hz. The output from amplifier 15 is a sine wave of amplitude proportional to $I_{ns} - I_{cs}$ when the sample air is in the chamber, and an amplitude proportional to $I_{nr} - I_{cr}$ when the reference air is present.

Figure 3:
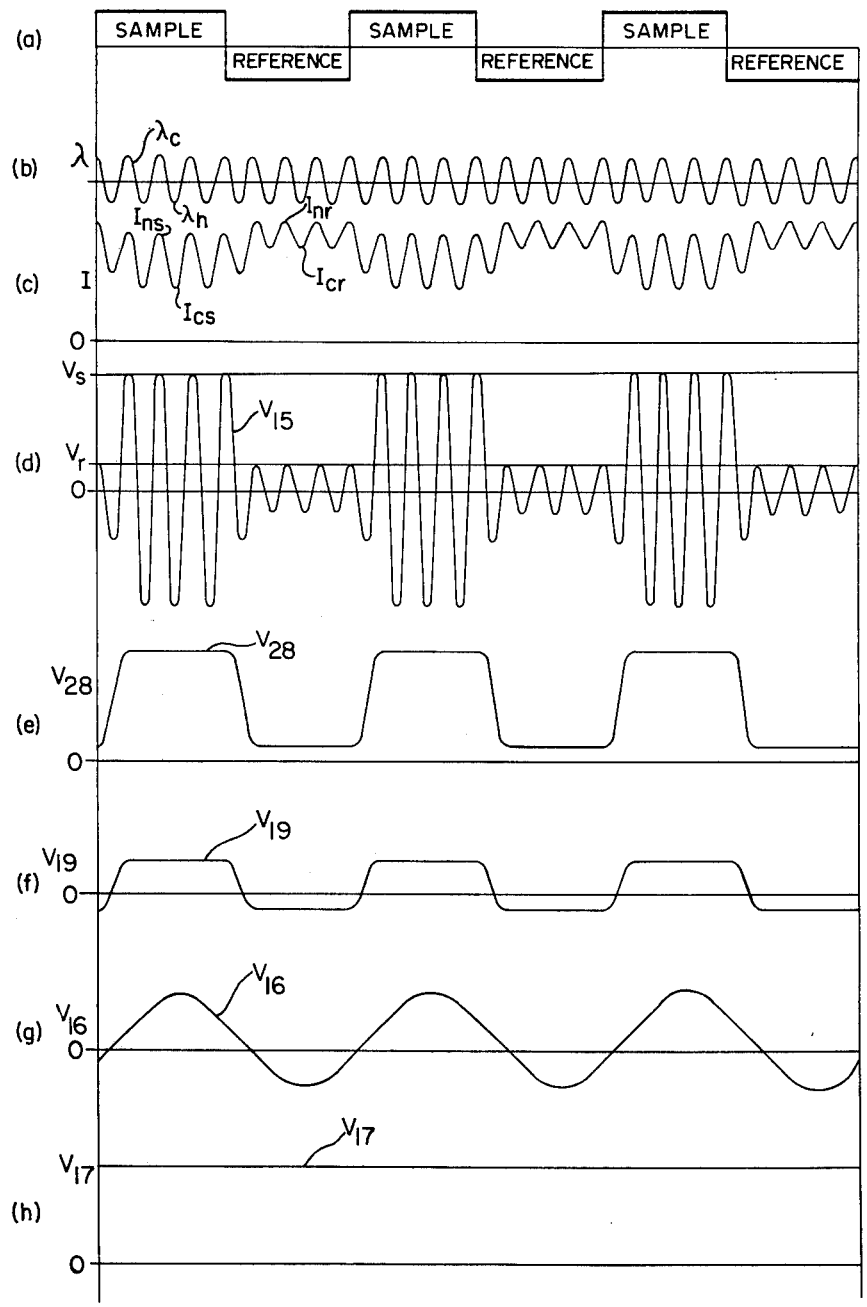
FIG. 3 illustrates the various control and voltage wave forms for the apparatus in FIG. 2.

The voltage $V_{15}$ at the output of amplifier 15 is a sine wave whose amplitude varies as shown in FIG. 3 (d) from $V_s$ when the sample air is flowing to $V_r$ with reference air.

$V_{15}$ is fed to demodulator 28, which is gated by wavelength modulator 27. The difference in amplitude of the voltage $V_{28}$ at the output of demodulator 28 is proportional to the difference between the HDO concentrations in the sample and reference air. $V_{28}$ is shown in FIG. 3(e).

Much of the HDO which exists in the sample air taken from duct 20 may be due to the natural HDO which is always present at a practically constant ratio in natural water and thus in the humidity of the sample air. Since it is desired to detect only the HDO that is in excess of the natural amount, a humidity sensing element 18 is located within chamber 1 and provides an output signal which is directly related to the humidity of the air in the chamber 1, whether that air is sample or reference air. The sensor 18 output is connected to linearizing circuit 19 which produces a voltage linearly proportional to the humidity, multiplies it by an adjustable factor and provides an output voltage $V_{19}$ shown in FIG. 3(f).

The abbreviations $h$ and $d$ are used for the concentrations of $H_2O$ and HDO, then in the reference air, $k = d/(h + d)$. If the humidity in the reference air is natural water, $k$ is approximately $288 \times 10^{-6}$.

The optical system produces a voltage proportional to the difference between $d_s$, the $d$ value in the sample, and $d_r$, the $d$ value in the reference air. We can therefore write $V_{28} = a(d_s - d_r)$, where $a$ is a constant. Similarly the humidity sensor produces a voltage proportional to the difference between $h_s + d_s$, the total water in the sample and $h_r + d_r$, the total water in the reference. We can therefore write $V_{19} = b [(h_s + d_s) - (h_r + d_r)]$ where $b$ is a constant.

A fraction $c$ of $V_{19}$ is substracted from $V_{28}$ before the difference $V_{28} - cV_{19}$ is amplified in 16. Then $V_{28} - cV_{19} = ad_s - ad_r - bc(h_s + d_s) + bc(h_r d_r)$.

If $c$ is adjusted so that $bc/a = k$, then $V_{28} - cV_{19} = a[d_s - k(h_s + d_s)] - a[d_r - k(h_r + d_r)]$. But in the reference vapor $d_r = k(h_r + d_r)$ or $V_{28} - cV_{19} = a [d_s - k(h_s d_s)]$.

The excess HDO in the sample is the difference between the amount present, $d_s$, and the amount which would be there is association with $h_s$. The latter, the natural abundance is $(k/l - k) \cdot h_s$, and the excess which the instrument must detect is:

$$d_s - \frac{k}{1-k} h_s$$

$$d_s - \frac{k}{1-k} h_s = \frac{1}{1-k} [d_s - k(h_s + d_s)]$$

$$= \frac{V_{28} - cV_{19}}{a(1-k)}$$

Thus $V_{28} - cV_{19}$ and therefore $V_{16}$ are exactly proportional to the excess HDO in the sample, regardless of the amount of natural water in the reference air.

More generally, by suitable adjustment of the factor $bc/a$, the instrument can be made to detect the addition, to an air stream, of vapour of any composition other than the reberence composition.

Amplifier 16 passes only frequencies below 50 mHz and gives the output voltage $V_{16}$ as shown in FIG. 3 $(g)$. Much of the harmonic content of $V_{19}$ and $V_{28}$ is therby removed.

A second demodulator 29 receives the voltage $V_{16}$ and provides an output proportional to the peak to peak value of $V_{16}$. This represents the amount of HDO in the sample air which is in excess of the amount attributable to natural humidity. The output of demodulator 28 is amplifier and smoothed by further operational amplifier 17 providing an output voltage $V_{17}$ shown in FIG. 3$(h)$.

Because the air interchange rezeros the signal every eighty seconds, slow drift is not a problem. Noise and short term drift are determined by the bandwith of amplifier 17 and the noise inherent in detector 12 measured at the frequency of the wavelength modulator 27. The noise level corresponds to about 3 mg/m³ before demodulator 29 and 0.3 mg/m³ after it.

The air interchange also simplifies the correction for the HDO present due to natural humidity. Although most solid state humidity sensors show serious zero drifts, this characteristic is essentially eliminated by the interchange modulation.

Temperature control is not critical, except that the source 4 (FIG. 1) must be sharply defined to avoid scattered radiation. A method of cooling for satisfactory source heat removal has been acheived with a simple finned heat dissipator and fan.

For testing and calibration an artificial set of atmospheres may be used but a simple test procedure will demonstrate to the operator that the instrument is working and has the correct sensitivity, time delay and time constant.

We claim:

1. An apparatus for monitoring air from a predetermined area to determine the concentration of HDO in excess of normally occurring HDO concentration in air, comprising:
   chamber means having an air inlet means and an air outlet means;
   means for alternately driving the predetermined area air and the normal air into the chamber means through the air inlet means, at a first frequency;
   means for producing a beam of radiation along a predetermined path in the chamber means, the radiation beam bandwidth alternating between a bandwidth coincident with at least one narrow absorption bandwidth of HDO and a bandwidth non-coincident with an absorption bandwidth of HDO at a second frequency greater than the first frequency;
   detector means located on said predetermined path for detecting the intensity of said beam; and
   indicating means connected to said detector means for providing an indication of the excess concentration of HDO as a function of radiation absorption.

2. An apparatus as claimed in claim 1 which further includes:
   humidity sensing means mounted within said chamber to measure the amount of water vapour in the predetermined area air and the normal air; and
   means for connecting the humidity sensing means to the indicating means to adjust the indication of the excess concentration of HDO for naturally occurring HDO.

3. An apparatus as claimed in claim 2 wherein said chamber means includes an elongated chamber with the outlet means located at one end and the inlet means located at the other end, the inlet means including first and second adjacent inlet pipes.

4. An apparatus as claimed in claim 3 wherein said driving means includes:
   a first blower for driving air from the predetermined area into the elongated chamber through the first inlet pipe and a second blower for driving normal air into the elongated chamber through the second inlet pipe; and
   modulation means for alternately activating the first and second blowers at said first frequency.

5. An apparatus as claimed in claim 4 wherein said beam producing means comprises:
   source means to provide a beam having a predetermined spectral range;
   a narrowband filter means mounted on said beam path; and
   oscillating means connected to said narrowband filter means for oscillating said narrowband filter means about its diameter at said second frequency to change the angle of incidence of said beam on said narrowband filter thereby continuously shifting the filter pass band.

6. An apparatus as claimed in claim 5 wherein said beam producing means further includes;
   broadband filter means rotatably mounted on said beam path to provide a uniform beam intensity over the predetermined spectral range by adjusting the angle of incidence of the beam on said broadband filter.

7. An apparatus as claimed in claim 6 which further includes a number of mirrors mounted at the ends of the elongated chamber such that the predetermined beam consists of a number of passes through the elongated chamber.

8. An apparatus as claimed in claim 7 wherein the first frequency is less than 1 Hz and the second frequency is greater than 85 Hz.

* * * * *